(12) United States Patent
Colpaert

(10) Patent No.: US 6,773,120 B2
(45) Date of Patent: Aug. 10, 2004

(54) OPTICAL PROJECTION SYSTEM AND METHOD FOR USING AN OPTICAL PROJECTION SYSTEM

(75) Inventor: Chris Colpaert, Lovendegem (Gent) (BE)

(73) Assignee: BARCO, naamloze vennootschap, Kortrijk (BE)

( * ) Notice: Subject to any disclaimer, the term of this patent is extended or adjusted under 35 U.S.C. 154(b) by 0 days.

(21) Appl. No.: 10/667,591

(22) Filed: Sep. 23, 2003

(65) Prior Publication Data

US 2004/0057023 A1 Mar. 25, 2004

Related U.S. Application Data

(60) Provisional application No. 60/428,720, filed on Nov. 25, 2002.

(51) Int. Cl.[7] ................................................ G03B 21/14
(52) U.S. Cl. ........................ 353/122; 348/771; 353/99
(58) Field of Search .............................. 353/31, 33, 34, 353/37, 98, 99, 122; 348/742, 743, 771

(56) References Cited

U.S. PATENT DOCUMENTS

| | | | |
|---|---|---|---|
| 6,188,524 B1 * | 2/2001 | Hayashi et al. ............. 359/651 |
| 6,382,799 B1 * | 5/2002 | Nishikawa et al. .......... 353/122 |
| 6,583,940 B2 * | 6/2003 | Nishikawa et al. .......... 359/738 |
| 6,698,902 B2 * | 3/2004 | Kawano et al. ................ 353/99 |
| 2002/0180935 A1 * | 12/2002 | Bone ............................. 353/31 |
| 2003/0227597 A1 * | 12/2003 | Silverstein et al. ............ 353/20 |

* cited by examiner

Primary Examiner—William C. Dowling
(74) Attorney, Agent, or Firm—Bacon & Thomas, PLLC

(57) ABSTRACT

Optical projection system, comprising a projection lens, illumination optics in front of the projection lens showing a well-defined F# number, and at least one light modulator comprising a plurality of reflective elements, wherein this system shows an optical axis and wherein said illumination optics allow to project light onto the light modulator and said light modulator allows to reflect the light in a controllable manner to different directions, such that ON state light cones, in which light is projected onto the projection lens, as well as OFF state light cones can be formed, wherein said projection lens shows an F# number which is smaller than the F# number of said illumination optics, and wherein the chief ray of the incident light at the light modulator is chosen such that the direction of the chief rays of the obtained ON state light cones differ from the corresponding optical axis, so as to obtain an improved contrast.

16 Claims, 4 Drawing Sheets

OPTICAL PROJECTION SYSTEM AND METHOD FOR USING AN OPTICAL PROJECTION SYSTEM

This application claims the benefit of provisional application No. 60/428,720 filed Nov. 25, 2002.

FIELD OF THE INVENTION

The present invention relates to an optical projection system, as well as to a method for using an optical projection system.

The invention particularly relates to an optical projection system of the type comprising a projection lens, illumination optics in front of the projection lens and at least one light modulator, such as a digital mirror device (DMD), comprising a plurality of reflective elements, wherein this system shows an optical axis and wherein said illumination optics allow to project light onto the light modulator and said light modulator allows to reflect the light in a controllable manner to different directions, such that ON state light cones, in which the light is projected onto the projection lens, as well as OFF state light cones can be formed.

In particular, the invention relates to an optical projection system which comprises a three-chip digital light processor (DLP).

BACKGROUND OF THE INVENTION

The illumination system of optical projection systems of the above described type, in particular of three-chip DLP projectors, is straight forward. Light collected from a lamp is collected at the entrance of an integration rod and imaged from the exit of the rod via relay optics and a color prism on the light modulator, particularly on the digital mirror device. Since such optical system is telecentric, all the pixels on the light modulator, in other words, each of the aforementioned reflective elements, are illuminated with the same cone of light. In well-known devices having an F# number of 3.0, conventionally this is a cone with a half angle of 9.46°. The incidence angle of the chief ray of the cone of light is for a traditional F#3.0 device in the color prism around 20°.

Traditionally, such DMD itself is a micro electro mechanical system (MEMS) consisting of an array of mirrors which form the abovesaid reflective elements (for SXGA resolution 1280×1024). Each individual mirror acts as a bi-stable device and can flip into two possible positions, usually between −10° and +10° with respect to a reference plane. When such mirror is tilted to −10° (for F#3.0 devices) the chief ray is reflected over an angle of 20°, right into the projection lens. The hereby obtained state is called the ON state and the obtained light cone is called the ON state light cone. When the mirrors are tilted to +10° (for F#3.0 devices) the chief ray is reflected over 60°, outside the projection lens. The hereby obtained state is called the OFF state and the respective light cones are called OFF state light cones. When light is falling in between the mirrors, the chief ray is reflected over an angle of 40°, resulting in a state which is called the FLAT state and the respective light cones are called FLAT state light cones.

In case the mirrors are in the ON state, the projection lens captures all the F#3.0 light cones leaving the mirrors. This means that all F#3.0 light cones pass the F#3.0 aperture of the projection lens.

In case the F#3.0 aperture is reshaped (e.g. a cat eye aperture), some of the light is blocked in the projection lens. Using a cat eye aperture results of course in a reduced light output, but can increase the contrast of the projector drastically, as explained in article SID 2002, Scott Dewald.

Another way to increase the contrast in DLP projectors is to increase the angle of the chief ray of the incident light. As a result the chief ray of the ON state light cone does no longer coincide with the optical axis of the system and is turned over a certain angle in respect to said optical axis. Also the FLAT state and OFF state cones are turned over a similar angle in respect to their normal positions. Tests have been shown that in this way the contrast can be increased, which probably can be explained by the fact that less diffused and diffracted light from the FLAT state light cone is captured in the projection lens.

Since also the ON state light cone is also shifted to bigger angles (with respect to the incident cone of light), the ON state light cone is not filling completely the traditional F#3.0 aperture of the projection lens. As a result, the light output is decreased to a quite large extent.

SUMMARY OF THE INVENTION

It is the object of the present invention to either increase the contrast level of the projection system with no or almost no loss of light output, or to increase the contrast tremendously with some loss of light output.

To this end, the present invention provides an optical projection system, comprising a projection lens, illumination optics in front of the projection lens showing a well-defined F# number, and at least one light modulator comprising a plurality of reflective elements, wherein this system shows an optical axis and wherein said illumination optics allow to project light onto the light modulator and said light modulator allows to reflect the light in a controllable manner to different directions, such that ON state light cones, in which light is projected onto the projection lens, as well as OFF state light cones can be formed, wherein said projection lens shows an F# number which is smaller than the F# number of said illumination optics, and wherein the chief ray of the incident light at the light modulator is chosen such that the direction of the chief rays of the obtained ON state light cones differ from the corresponding optical axis, so as to obtain an improved contrast.

By using a layout as described above, for the reasons explained before, an important increase of contrast can be obtained due to the fact that the chief rays of the obtained ON state light cones differ from the direction of the optical axis.

Meanwhile, by using a projection lens with an F# number which is smaller than the F# number of the illumination optics, a large portion of the light of the ON state light cones, if not all light of these ON state light cones, can be captured and no of almost no light output is lost.

In a preferred embodiment, the abovesaid technique is also combined with the use of a non-circular aperture, particularly a cat-eyed aperture. This of course reduces the light output (some light is blocked in the projection lens), but the contrast level will increase tremendously. The invention also relates to a method for using an optical projection system, said projection system comprising a projection lens, illumination optics in front of the projection lens showing a well-defined F# number, and at least one light modulator comprising a plurality of reflective elements, wherein this system shows an optical axis and wherein said illumination optics allow to project light onto the light modulator and said light modulator allows to reflect the light in a controllable manner to different directions, such that ON state light cones, in which light is projected onto the projection lens, as well as OFF state light cones can be formed, wherein said method comprises the steps of using a projection lens which shows an F# number which is smaller than the F# number of said illumination optics, and the step of choosing the chief ray of the incident light at the light modulator such that the direction of the chief rays of the obtained ON state light cones differ from the corresponding optical axis.

The invention can be applied in new projection systems, as well as in existing projection systems. Especially in the last case, the invention is of considerable importance, as an existing projector can easily be transformed to a projector having the features of the present invention, just by rearranging the optical components such that the direction of the incident light is changed and by replacing the projection lens by another one with a lower F# number.

BRIEF DESCRIPTION OF THE DRAWINGS

With the intention of better showing the characteristics of the invention, hereafter, as example without any limiting character, some preferred forms of embodiment are described, with reference to the accompanying drawings, wherein.

DETAILED DESCRIPTION OF PREFERRED EMBODIMENTS

Figure 1:
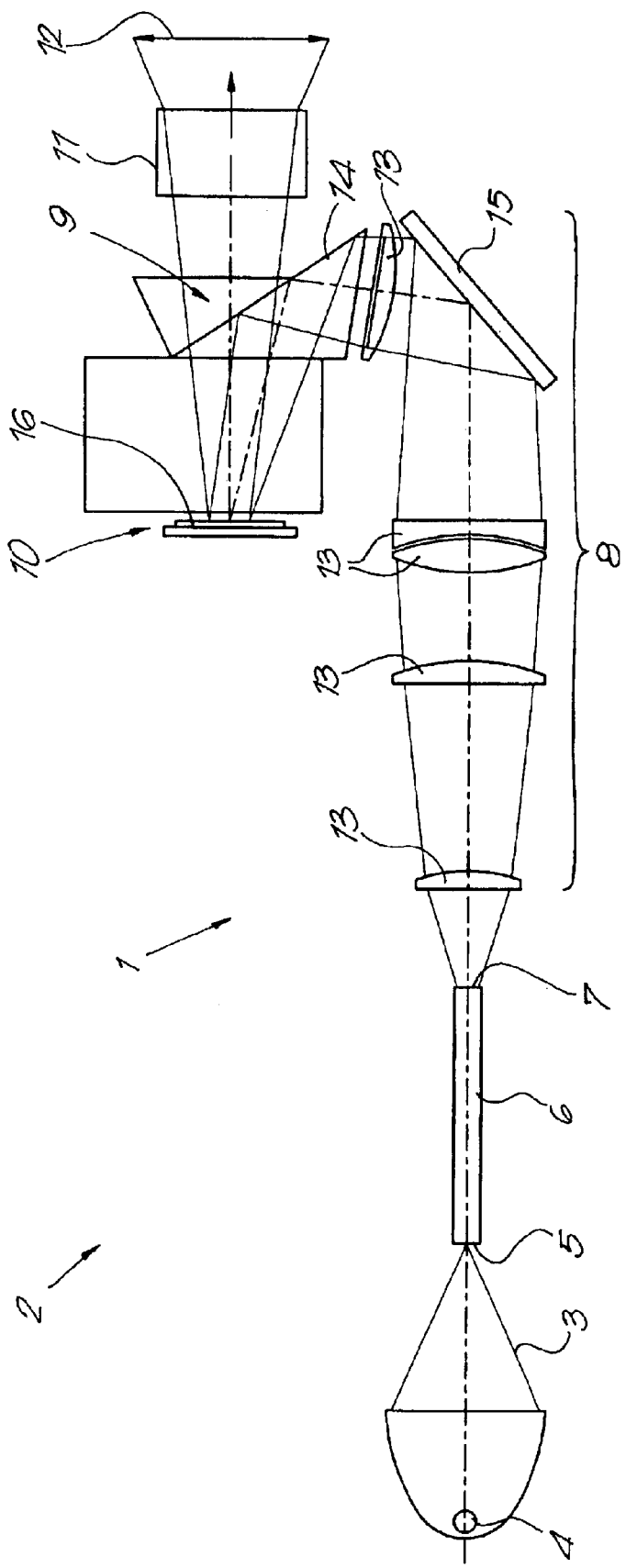
FIG. 1 shows the general lay-out of an optical projection system in which the invention can be applied.

FIG. 1 shows the illumination system 1 of an optical projection system 2 of the abovementioned type.

In the illumination system 1, light 3 collected from a lamp 4 is collected at the entrance 5 of an integration rod 6 and imaged from the exit 7 of the rod 6 via relay optics 8 and a TIR prism 14 and a color prism 9 on the light modulator 10, which preferably consists of a digital mirror device. From the modulator 10, the light is reflected in a controllable manner through the projection lens 11 so as to form an image 12.

The relay optics 8 usually consist of a plurality of lenses 13 and reflective elements, such as one or more TIR prisms 14 and one or more folding mirrors 15.

As explained before, the light modulator 10, particularly the DMD itself, is a micro electro mechanical system (MEMS) comprising an array 16 of reflective elements or mirrors, which define pixels, whereby each of these elements acts as a bi-stable device and can flip into two possible positions, usually between −10° and +10° with respect to a reference plane.

Such light modulators, particularly such digital mirror devices, are well-known in the art and the specific layout and functioning thereof is well-known to the persons skilled in the art, and therefore the construction of this device is no further explained.

In the schematic representation of FIG. 1, only one array 16 of reflective elements is shown. It should however be noted that normally three arrays of reflective elements are used and that in the color prism 9 the white light 3 is split in the three basic colors, whereby the light of each color is directed to a separate array of reflective elements, such that each of the colors in a controlled manner can be transmitted to the projection lens, for each pixel separately.

Figure 2:
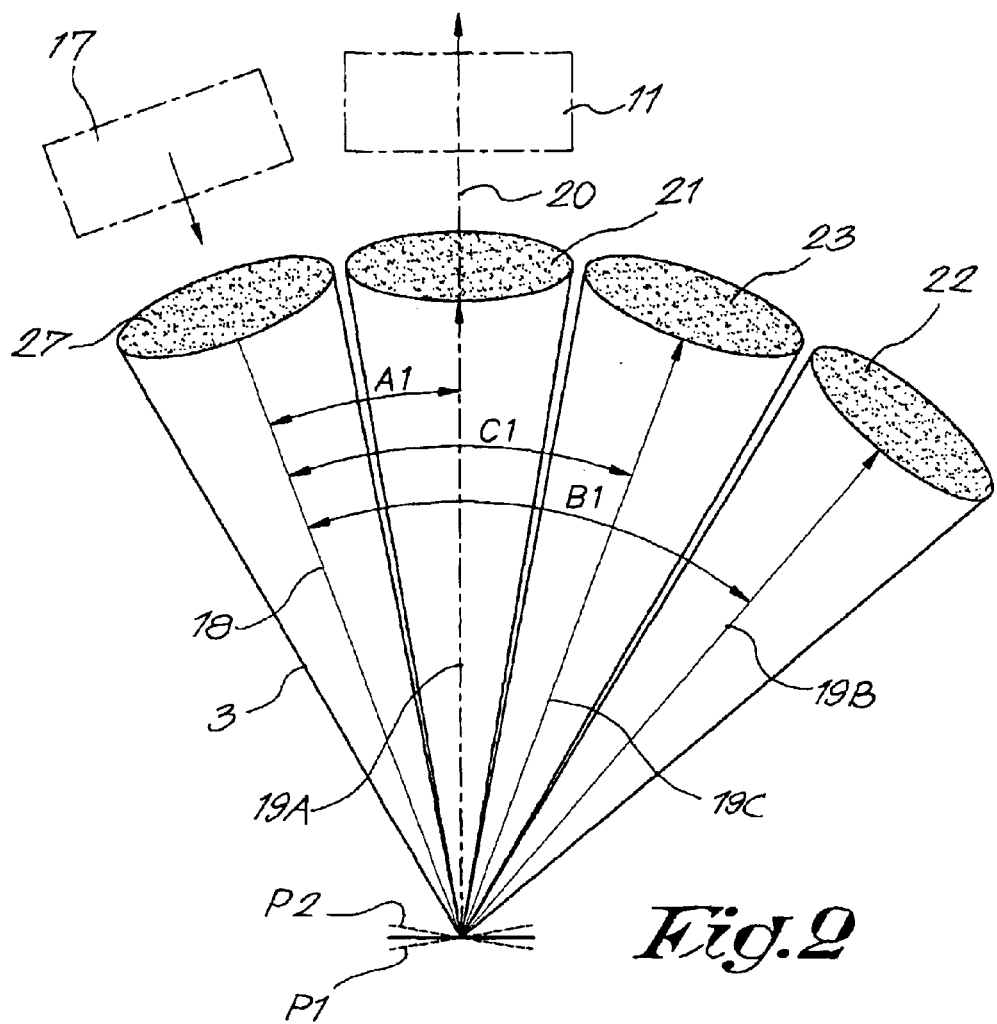
FIG. 2 schematically shows how light is reflected in a traditional optical projection system of the DLP type.

FIG. 2 shows how the light 3 can be modulated by means of the light modulator 10, in other words, how it can be controlled for each reflective element of the array 16. Hereby, in FIG. 2 is represented the light reflected by one reflective element of said array 16. Such reflective element can be tilted between two positions which are schematically indicated by P1 and P2 and which respectively are positions at −10° and +10°. Furthermore, in FIG. 2, the illumination optics in front of the projection lens 11, and particularly in front of the light modulator 10, are generally indicated with reference 17.

When a reflective element of said array 16 is tilted into the position P1 of −10° (for F#3.0 devices), the incident chief ray 18 is reflected over an angle A1 of 20°, resulting in an outgoing chief ray 19A, right into the projection lens 11, which chief ray 19A coincides with the optical axis 20 of the system. The hereby obtained state is the ON state, which schematically is represented by the ON state light cone 21.

When such reflective element is tilted to +10° (for F#3.0 devices) the incident chief ray 18 is reflected over an angle B1 of 60°, resulting in an outgoing chief ray 19B, such that a light cone is obtained completely outside the projection lens 11, which is called the OFF state light cone 22.

When light is falling in between the reflective elements, the chief ray 18 is reflected over an angle C1 of 40°, resulting in a state which is called the FLAT state, which is characterized by a chief ray 19C and a FLAT state light cone 23.

Figure 3:
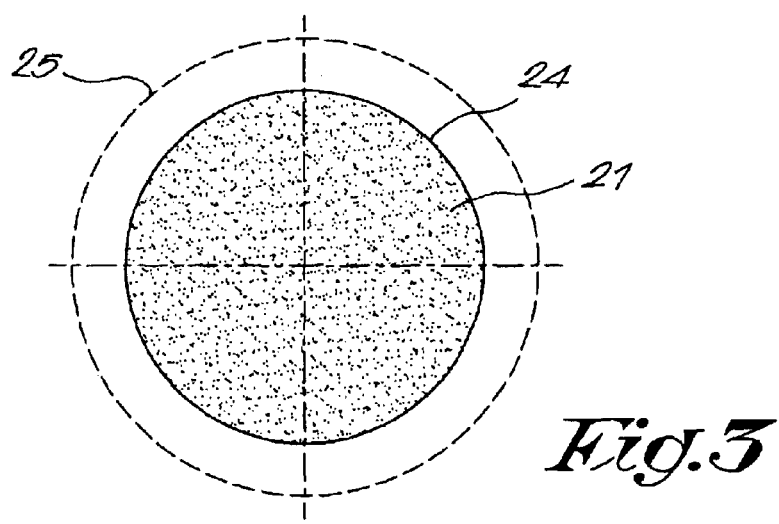
FIG. 3 schematically shows a projection lens entrance pupil for an F#3.0 aperture in an F#2.5 projection lens.

In case the reflective elements are in the ON state (flipped to −10° in the example of FIG. 2), the projection lens 11 captures all the F#3.0 light cones 21 leaving the array 16 of reflective elements. This means that all F#3.0 light cones 21 pass the F#3.0 aperture 24 of the projection lens 11, as schematically shown in FIG. 3. By way of comparison, also an F#2.5 aperture 25 is shown in this figure.

Figure 4:
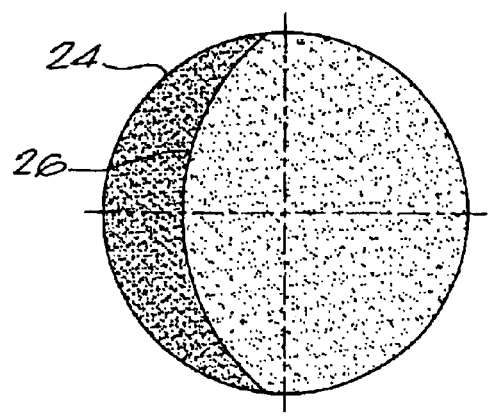
FIG. 4 schematically shows a projection lens entrance pupil for a cat eye shaped F#3.0 aperture in an F#3.0 projection lens.

In case the F#3.0 aperture 24 is reshaped, e.g. as a cat eye aperture 26 as shown in FIG. 4, some of the light is blocked in the projection lens 11. Using such cat eye aperture 26 results of course in a reduced light output, but can increase the contrast of the projector drastically, as explained in article SID 2002, Scott Dewald.

Figure 5:
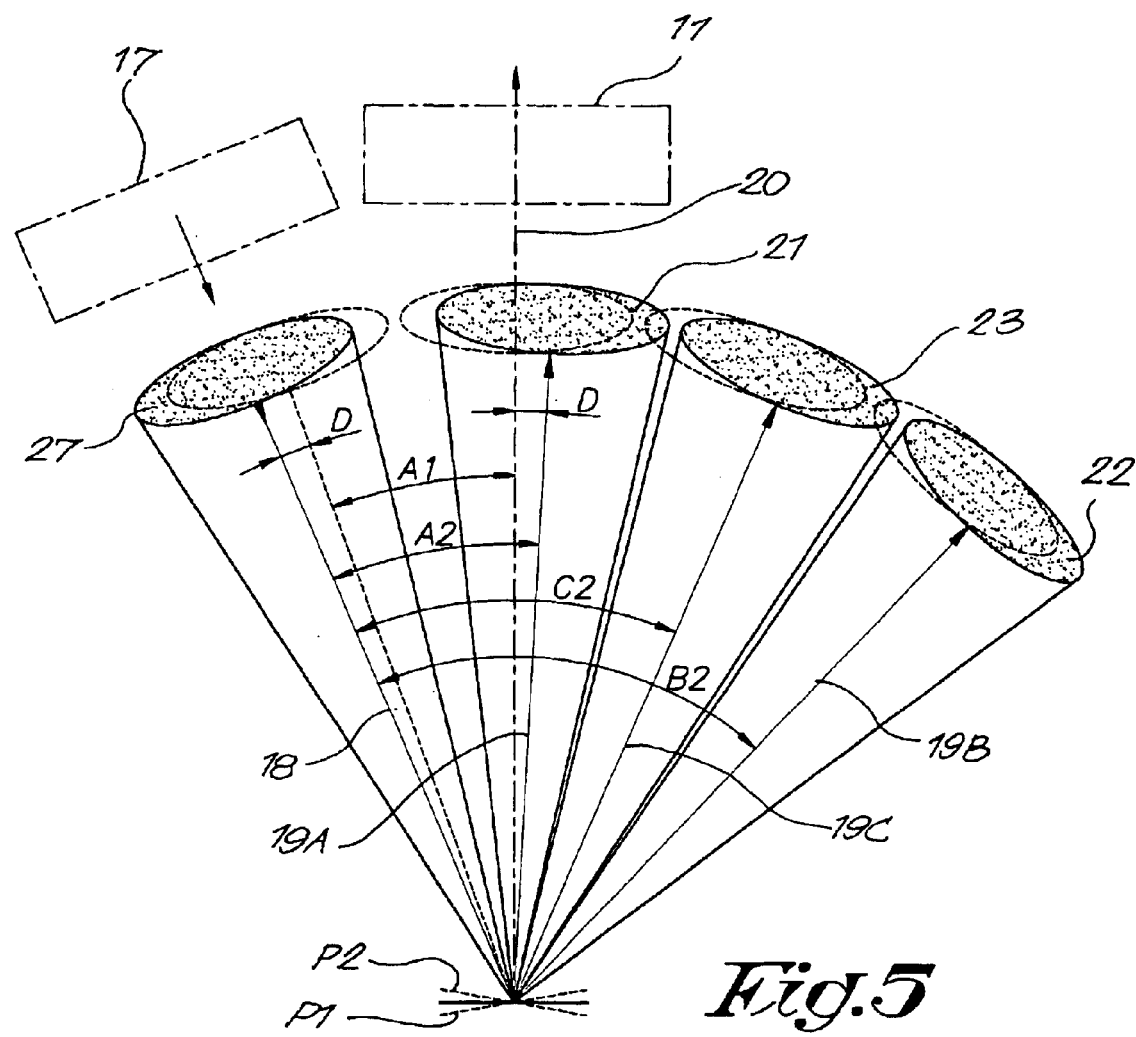
FIG. 5 shows a representation similar to the one in FIG. 2, however, for an increased angle of the incident light.

Another way to increase the contrast in DLP projectors is to increase the angle of the chief ray 18 of the incident light. FIG. 5 illustrates what happens when the angle of incident light is changed, for example from 20° with respect to the optical axis 20 in FIG. 2 to 23° in FIG. 5. As a result, the chief ray 19A of the ON state light cone 21 does no longer coincide with the optical axis 20, but is shifted over an angle D, which in this case is 3°. Also the OFF state light cone 22 and the FLAT state light cone 23 are shifted over this angle D. The outgoing chief rays 19A, 19B and 19C are then under angles with the chief ray 18 of the incident light, indicated by A2, B2 and C2.

Tests have proven that in this way an increased contrast can be obtained, probably for the reason explained in the introduction.

Figure 6:
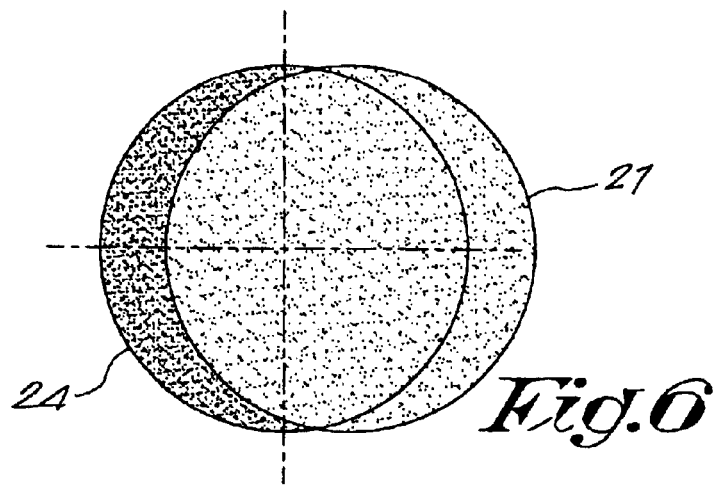
FIG. 6 shows a representation similar as the one of FIG. 4, however, for an increased angle of the incident light instead of using a cat eye shaped aperture.

Since the ON state light cone 21 is shifted to a bigger angle with respect to the incident cone of light 27, the ON state light cone 21 is not filling completely the aperture 24 of the projection lens 11, as shown in FIG. 6. As a result, the light output is decreased, but the contrast is increased, probably because less stray light is entering the entrance pupil of the projection lens 11.

According to the present invention, a still better effect is created by using, in combination with a shifting of the ON state light cones 21, also a projection lens 11 which shows an F# number which is smaller than the F# number of the illumination optics 17 in front of this lens 11, for example by using an F#2.5 projection lens 11 in a classical F#3.0 projection system. As a result, a situation is obtained as illustrated in FIG. 7, from which it is clear that more light, if not all light of the shifted ON state light cone 21 can be captured by the aperture 25 of the lens 11, such that notwithstanding the increase of the contrast level, there is no loss of light output.

Figure 7:
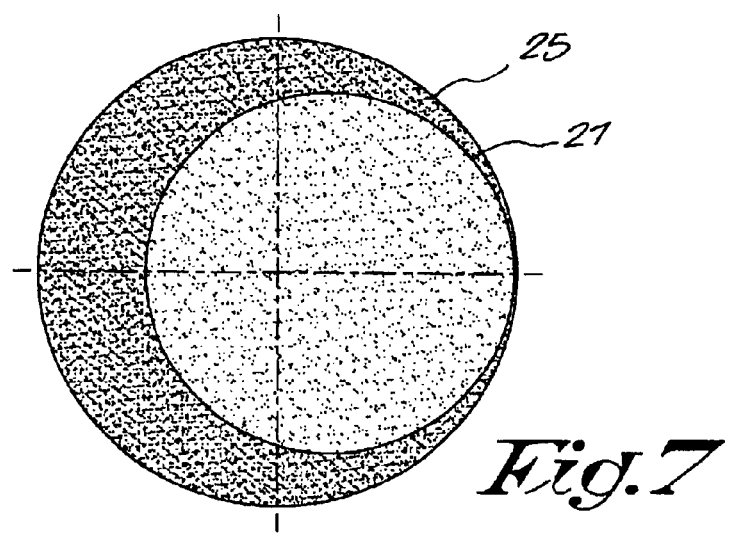
FIG. 7 shows what happens when an increased angle of incidence is applied, combined with the use of illumination optics having an F#3.0 aperture in an F#2.5 projection lens.

As shown in FIG. 7, the aperture 25 is preferably matched to the F# number of the illumination optics 17, by which is meant that the ON state light cones 21 completely fit within the aperture 25, such that all light thereof can be captured. Particularly, it is preferred that an eccentric layout is applied wherein the ON state light cones 21 are located such that at one side it coincides or almost coincides with the edge of the lens aperture 25.

Figure 8:
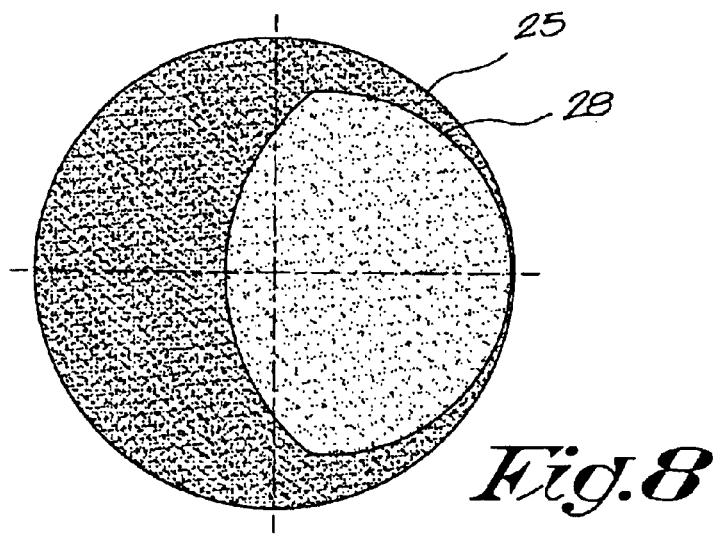
FIG. 8 shows a representation similar as the one of FIG. 7, however, when using a cat-eyed aperture.

FIG. 8 illustrates that the technique of the invention can also combine with a non-circular aperture, preferably a cat eye aperture 28. This of course reduces the light output as some light is blocked in the projection lens 11, but the contrast level will increase tremendously.

Although the invention is represented in the drawings with an angle D of 3°, it is clear that this angle may have other values. Preferably the angle D amounts between 1° and 10°. In a practical embodiment it will be 4°.

It is not excluded to apply the invention in other optical projection systems than these in which the light modulator consists of a digital mirror device. Furthermore, it can also be applied in devices with reflective elements which can be flipped between other angles than these of −10° and +10°.

Preferably, in general, the chief ray 18 of the incident light extends according to a direction which makes an angle with the optical axis 20 which is between 20° and 30°.

The present invention is in no way limited to the forms of embodiment described by way of example and represented in figures, however, such optical projection system, as well as the method applied in such projection system, can be realized in various forms without leaving the scope of the invention.

What is claimed is:

1. Optical projection system, comprising a projection lens, illumination optics in front of the projection lens showing a well-defined F# number, and at least one light modulator comprising a plurality of reflective elements, wherein this system shows an optical axis and wherein said illumination optics allow to project light onto the light modulator and said light modulator allows to reflect the light in a controllable manner to different directions, such that ON state light cones, in which light is projected onto the projection lens, as well as OFF state light cones can be formed, wherein said projection lens shows an F# number which is smaller than the F# number of said illumination optics, and wherein the chief ray of the incident light at the light modulator is chosen such that the direction of the chief rays of the obtained ON state light cones differ from the corresponding optical axis, so as to obtain an improved contrast.

2. Optical projection system as in claim 1, wherein the aperture of the projection lens is matched to the F# number of said illumination optics and is placed eccentric in respect to the optical axis.

3. Optical projection system as in claim 2, wherein the ON state light cones are located such that at one side they coincide or almost coincide with the edge of the projection lens aperture.

4. Optical projection system as in claim 2, wherein for further improving the contrast, a non-circular aperture is used.

5. Optical projection system as in claim 4, wherein the non-circular aperture is a cat-eyed aperture.

6. Optical projection system as in claim 1, wherein said light modulator is a digital mirror device (DMD).

7. Optical projection system as in claim 6, wherein said digital mirror device comprises reflective elements which can be flipped between 10° in one direction as well as 10° in the opposite direction.

8. Optical projection system as in claim 1, wherein the chief ray of the ON state light cone differs from the corresponding optical axis with an angle between 1° and 10°.

9. Optical projection system as in claim 8, wherein said angle is 4°.

10. Optical projection system as in claim 1, wherein the chief ray of the incident light extends according to a direction which makes an angle with the optical axis of the projection lens which is between 20° and 30°.

11. Optical projection system as in claim 1, wherein said illumination optics are designed for use with an aperture with an F# number of 3.0 and wherein a projection lens is used with an aperture having a F# number of 2.5.

12. Optical projection system as in claim 1, wherein said projection system consists of an existing system, which is adapted in order to obtain ON state light cones having a chief ray which differs from the optical axis of the projection lens.

13. Method for using an optical projection system, said projection system comprising a projection lens, illumination optics in front of the projection lens showing a well-defined F# number, and at least one light modulator comprising a plurality of reflective elements, wherein this system shows an optical axis and wherein said illumination optics allow to project light onto the light modulator and said light modulator allows to reflect the light in a controllable manner to different directions, such that ON state light cones, in which light is projected onto the projection lens, as well as OFF state light cones can be formed, wherein said method comprises the steps of using a projection lens which shows an F# number which is smaller than the F# number of said illumination optics, and the step of choosing the chief ray of the incident light at the light modulator such that the direction of the chief ray of the obtained ON state light cones differ from the corresponding optical axis.

14. Method for using an optical projection system as in claim 13, wherein a non-circular aperture is used, more particularly a cat-eyed aperture.

15. Method for using an optical projection system as in claim 13, wherein said system in normal use is intended for use with a projection lens with an F#3.0 aperture, whereas, when applying this method, a projection lens is used with an F#2.5 aperture.

16. Method for using an optical projection system as in claim 13, wherein said method is applied in an existing projection system, whereby to this end the angle of the incident light is changed and the traditional projection lens is replaced by another one with a lower F# number.

* * * * *